United States Patent
Yeo et al.

(10) Patent No.: US 6,473,866 B1
(45) Date of Patent: Oct. 29, 2002

(54) TIME SYNCHRONIZING METHOD FOR SWITCHING SYSTEM

(75) Inventors: Nam Soo Yeo, Anyang (KR); Ki Moon Nham, Anyang (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/342,910

(22) Filed: Jun. 30, 1999

(30) Foreign Application Priority Data

Sep. 3, 1998 (KR) .................................. 98-36694

(51) Int. Cl.[7] .................................................. G06F 1/04
(52) U.S. Cl. ...................... 713/500; 710/58; 709/400; 713/400; 368/10
(58) Field of Search .................. 709/400; 713/400, 713/500, 502; 368/10, 46; 710/58

(56) References Cited

U.S. PATENT DOCUMENTS

| | | | | |
|---|---|---|---|---|
| 5,040,158 A | * | 8/1991 | Lee et al. ..................... 368/10 |
| 5,084,816 A | * | 1/1992 | Boese et al. ................. 370/225 |
| 5,327,402 A | * | 7/1994 | Shinomiya .................... 368/46 |
| 5,402,394 A | * | 3/1995 | Turski .......................... 368/10 |
| 5,661,700 A | * | 8/1997 | Weppler ....................... 368/10 |
| 5,933,485 A | * | 8/1999 | Chang et al. ........... 379/209.01 |
| 6,260,162 B1 | * | 7/2001 | Typaldos et al. ............. 714/25 |

* cited by examiner

*Primary Examiner*—Jeffrey Gaffin
*Assistant Examiner*—Harold Kim
(74) *Attorney, Agent, or Firm*—Fleshner & Kim, LLP

(57) ABSTRACT

A time management method for a switching system include: periodically checking a failure state of an HW time using an OMDC; setting the HW time or a user time as an initial system time in accordance with the failure state of the HW time; resetting a system time by periodically comparing the HW time or an MP time, in which an IPC delay is considered, with an OMP time; requesting the initial system time to an OMP; setting an initial MP time as the received OMP time; and periodically comparing the MP time in which the IPC delay is considered with the OMP time and thereby resetting the MP time.

29 Claims, 12 Drawing Sheets

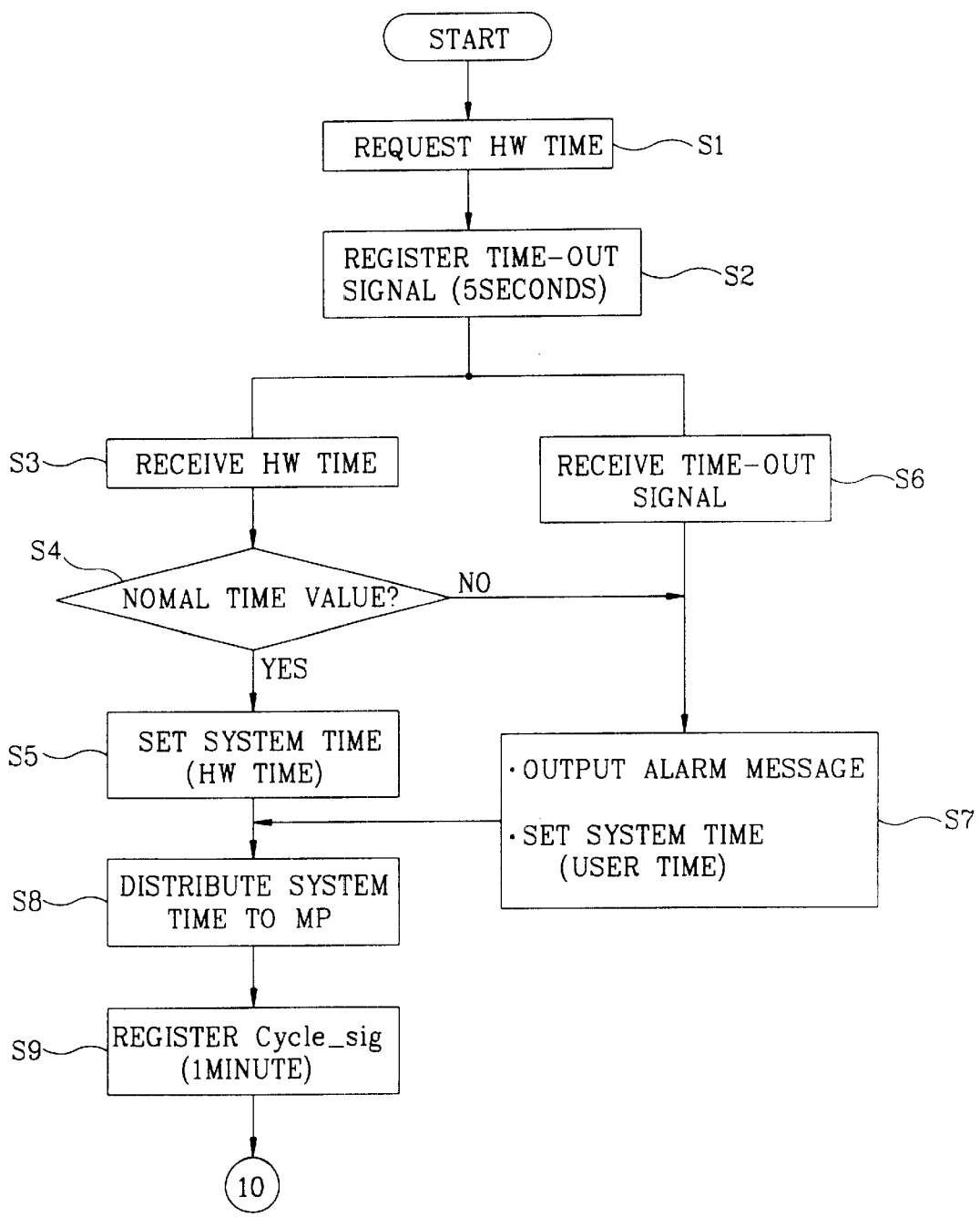

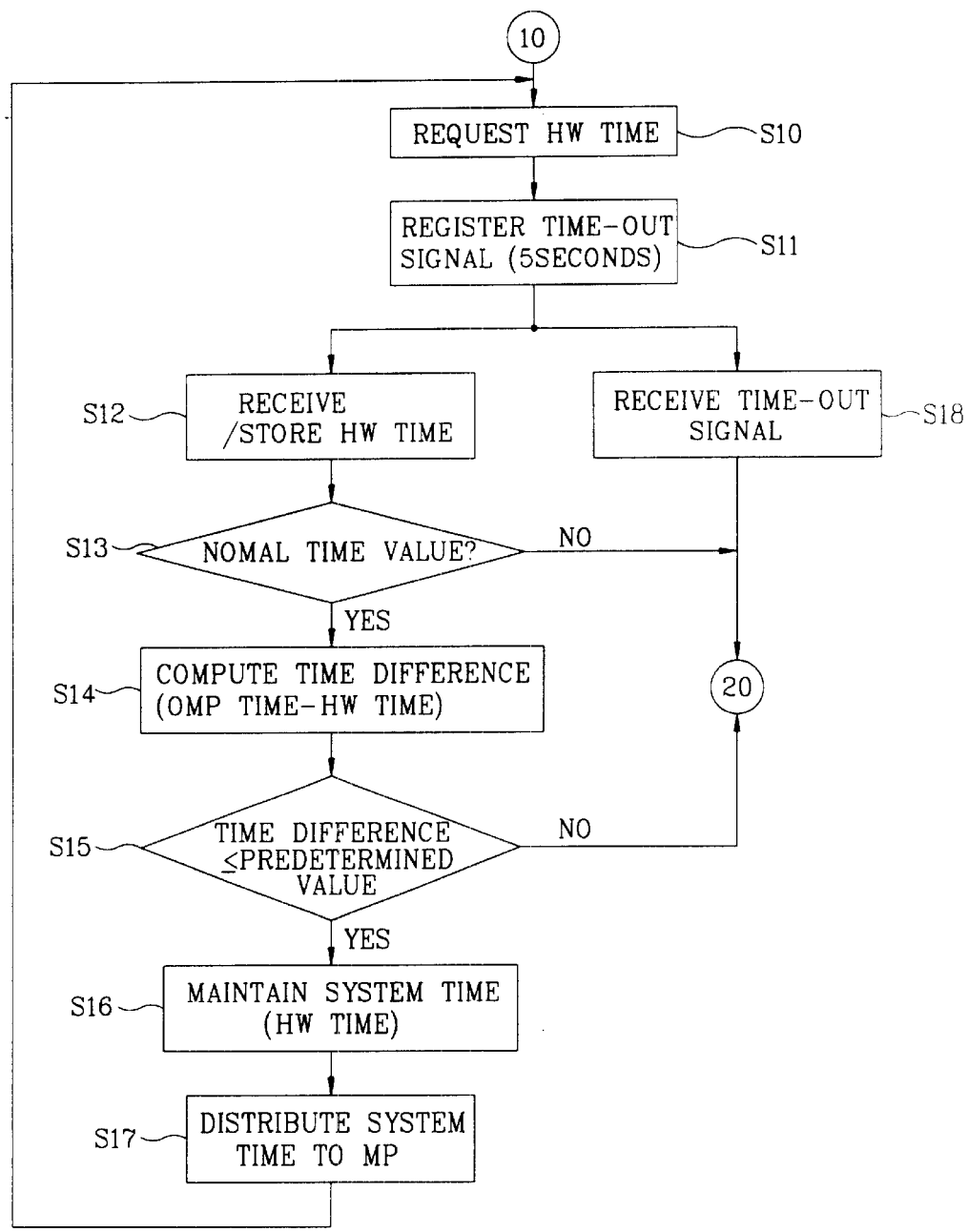

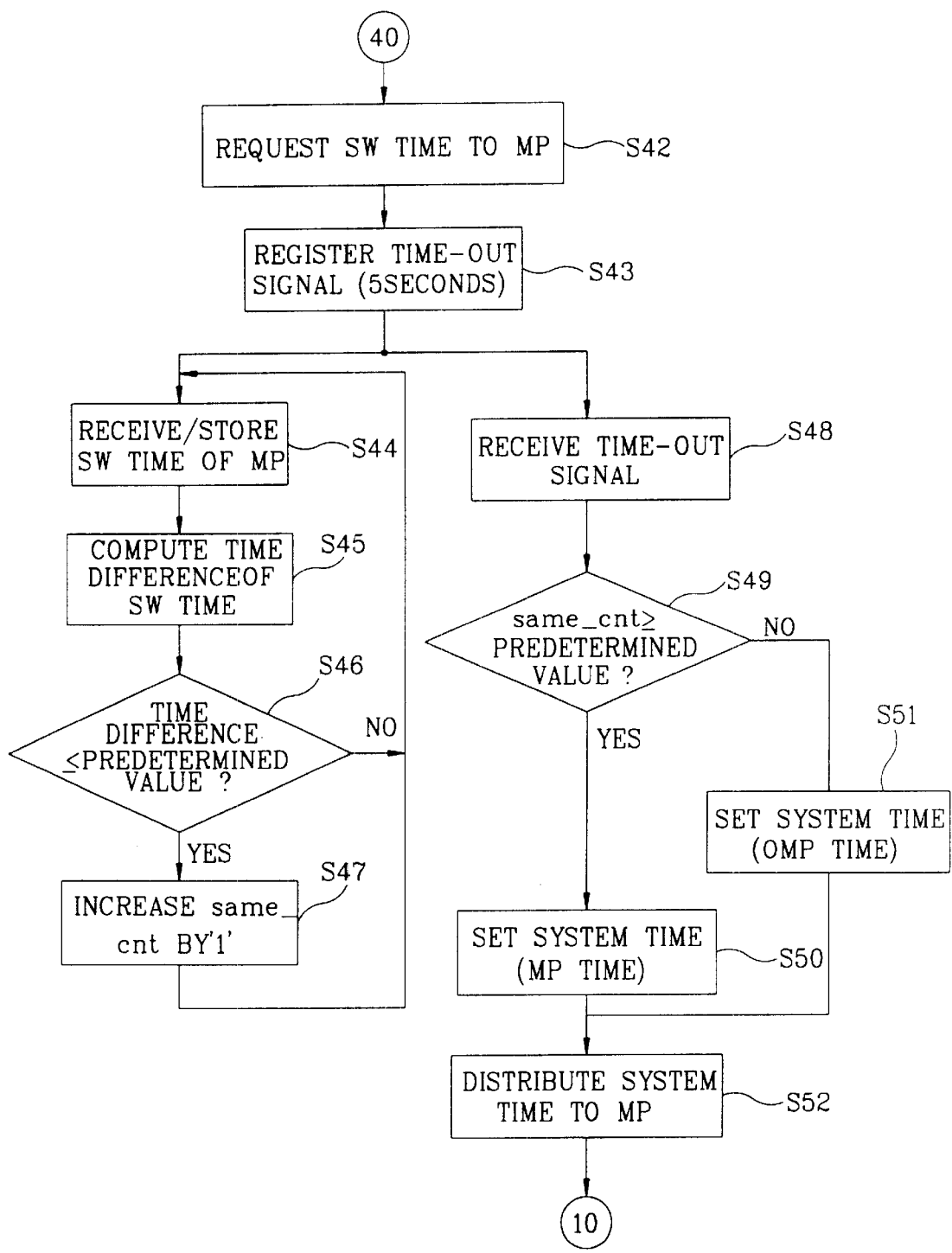

TIME SYNCHRONIZING METHOD FOR SWITCHING SYSTEM

BACKGROUND OF THE INVENTION

1. Field of the Invention

The present invention relates to a switching system, and more particularly to a time management method for a switching system.

2. Description of the Conventional Art

Generally, time of a switching system must be synchronized with International Standard Time. However, since the switching system has no synchronizing apparatus, an indirect way is applied. For example, a referential time (TDC: year, month, day, time, minute and second) of the switching system is set in accordance with a hardware HW time supplied from a time generating apparatus, a software SW time which is maintained by a real time clock (RTC) of each processor and a user time supplied by an operator.

FIG. 1 illustrates a time management apparatus for the conventional switching system.

As shown therein, the time management apparatus for the conventional switching system includes an OMP (operating and maintenance processor) 100, an OMDC (operating and maintenance device controller) 200, an HW time device 300, and an MP (maintenance processor) 400.

Particularly, the OMP 100 which operates and maintains the switching system determines a system time and periodically checks the time concordance using an SCM (system clock management), a system time management master. Also, the OMP 100 distributes the system time which has been determined in the system time determining process and periodical time concordance checking process to the MP 400.

The OMDC 200 controlling and checking an HW time is connected with the OMP 100 through an IPC (inter processor communication) 10 and connected with the HW time device 300 through a DA (data access)-bus, accesses the HW time device 300 in accordance with an HW time request of the OMP 100, and reports the accessed HW time to the OMP 100.

The MP 400 consisting of an SNP (switching network processor) 40 and a plurality of SSPs (switching subsystem processors) 40-1~40-n is connected with the OMP 100 through IPC links 11~17. The description of the connection and operation of the IPC links will be omitted since it is irrelevant to the time management operation. The SSPs 40-1~40-n carry out user/trunk matching and time switching operations and the SNP 40 performs space switching of outputs of the SSPs 40-1~40-n and supplies the resultant outputs to a plurality of highways. Here, the number of SSPs 40-1~40-n connected with the SNP 40 can be up to 32 at its maximum in consideration of the highways. In addition, the SNP 40 and the SSPs 40-1~40-n are respectively provided with the SCM block of itself and set its own SW time in accordance with system time which is distributed by the OMP 100.

With reference to FIG. 1, the operation of the time management apparatus for the conventional switching system will now be described.

In the initial start (or restart) of the system, the SCM block of the OMP 100 requests the OMDC 200 through the IPC line 10 to send the HW time, and the OMDC 200 access the HW time device 300 through the DA-bus and reports the HW time to the OMP 100. When receiving the HW time from the OMDC 200, the SCM block of the OMP 100 sets the HW time as an initial system time and then distributes the initial system time to the MP 400 through the IPCs 11~17. However, if not receiving the HW time from the OMDC 200 due to defect of the HW time device 300, the SCM block of the OMP 100 sets a predetermined time which is set by a user as the initial system time and distributes the initial system time to the MP 400. Accordingly, the SCM blocks of the SNP 40 and the SSPs 40-1~40-n of the MP 400 respectively set the time (SW time) of its own in accordance with the initial system time which is distributed from the OMP 100. When the initial system time is set, the SCM block of the OMP 100 periodically resets the system time with reference to the HW time, the OMP time and the MP time in order, and distributes the reset system time to the MP 400, so that the times of the switching system concur.

Now, the time management method of the conventional switching system will be described with reference to FIG. 2.

Setting of Initial System Time

FIG. 2 is a flowchart illustrating setting of an initial system time in the system initial start (or restart). The system time management master is the SCM block of the OMP 100. The SCM block request the HW time to the OMDC 200 when starting the system, the OMP 100 or the SCM block thereof, and registers a time-out signal of 5 seconds with an OS (operation system) (S1, S2). When receiving the HW time from the OMDC 200 before the time-out signal is inputted, the SCM block determines whether the received HW time has a normal time value (S3, S4) by checking time data (year, month, day, time, minute, second) of the HW time. For example, the normality of the HW time is determined by checking whether the time data is under 24 and minute and second data are respectively under 60. When the HW time has the normal time value, the SCM block sets the received HW time as the initial system time (the initial system time=the HW time).

Meanwhile, when if the HW time is not outputted from the OMDC 200 until the time-out signal is supplied from the OS (S6) or the HW time has an abnormal time value in the step S4, the SCM block outputs an alarm message and then sets the time set by the user as the initial system time (the initial system time=the user time) (S7). Once the initial system time is set, the SCM block distributes the initial system time to the MP 400 (S8), and the SNP 40 and SSPs 40-1~40-n of the MP 400 respectively set the time of itself (SW time) as the initial system time and process all the functions, for example, metering, related with the time on the basis of the SW time. Further, the SCM block registers a cycle signal Cycle_sig of a 1 minute cycle with the OS to periodically check the time concordance (S9).

Periodical Time Concordance Checking

FIGS. 3A through 3D are flowcharts illustrating checking of the time concordance with reference to the HW time, the OMP time and the MP time.

As shown therein, when the initial system time is set, the SCM block of the OMP 100 operates (is interrupted) in a 1 minute cycle in accordance with the cycle signal Cycle_sig and thus resets the system time referring to the HW time, the SW time of the OMP 100 or the SW time of the MP 400. That is, the SCM block compares in order the HW time with the OMP time, the HW time with the MP time, the OMP time with the MP time and the MP times with each other, thereby determining the system time, because the reliability of the time is in order of the HW time, the OMP time and the MP time. Further, when the above processes are all failed, the OMP time is set as the system time. When the system time is reset, the SCM block distributes the reset system time to the MP 400, and thus periodically checks the time concordance by making the times of the dispersed processors concur with each other, that is, the SNP 40 and the SSPs 40-1~40-n of the MP 400.

More specifically, FIG. 3A is a flowchart illustrating the operation of comparing the HW time with the OMP time and thus determining the system time. As shown therein, The SCM block of the OMP 100 which operates in the 1 minute cycle in accordance with the cycle signal Cycle_sig requests the HW time to the OMDC 200 and registers the time-out signal with the OS (S10, S11). When receiving the HW time from the OMDC 200, the SCM block stores the received HW time and checks whether the HW time has the normal time value (S13). When the HW time is normal, the SCM block computes the time difference between the time (the OMP time) maintained by the RTC of itself and the HW time (S13, S14) and determines whether the computed time difference is a predetermined value (3 seconds) and below (S15). If the time difference is the 3 seconds and below, the SCM block resets the corresponding HW time as the system time (the system time=the HW time) (S16) and distributes the corresponding system time to the MP 400 (S17). As a result, each of the SNP 40 and the SSPs 40-1~40-n of the MP 400 unconditionally synchronizes the time thereof with the reset system time, so that the times of the dispersed processors concur with each other. However, when the SCM block receives the time-out signal without receiving the HW time (S18) or when the time difference is greater than the predetermined value (3 seconds) in the step S15, the SCM block proceeds to a step S21, which will be later described, and compares the HW time with the time of the MP 400. FIG. 3B is a flowchart illustrating the operation which compares the HW time with the MP time and thus determining the system time. As shown therein, the SCM block of the OMP 100 requests the SW time to the MP 400 and registers the time-out signal with the OS (S21, S22). When receiving the SW time from the SCM of each of the SNP 40 and the SSPs 40-1~40-n, the SCM block of the OMP 100 stores the received SW times and checks whether the SCM already received the HW time in the above-mentioned step S12 of FIG. 3A (S24). When having received the HW time, the SCM block computes the time difference between the HW time and the MP time, for example, the SNP 40 (S25), and checks whether the computed time difference is the predetermined value (3 seconds) and below. As a result, if the time difference between the HW time and the MP time is the 3 seconds and below, the SCM block increases a count value same_cnt by "1" and returns to the step S23 (S27). Repeatedly performing the above operation, the SCM block sequentially compares the HW time with each time of the SSPs 40-1~40-n, until the time-out signal is supplied from the OS. When receiving the time-out signal after 5 seconds (S28), the SCM block compares the count value same_cnt with a predetermined value (3 times) (S29). Here, if the count value same_cnt is the same as the predetermined value or more, that is, if a case where the time difference is the 3 seconds and below is generated at least 3 consecutive times, the SCM block resets the system time as the HW time and distributes the reset system time to the MP 400 (S30, S31). However, if the HW time is not received in the step (S12) of FIG. 3A or when the counter value same_cnt is less than the predetermined value, the SCM block proceeds to a step S32, which will be later described, and compares the OMP time with the MP time.

FIG. 3C is a flowchart illustrating the operation which compares the OMP time with the MP time and thus determines the system time. As shown therein, the SCM block requests the SW time to the MP 400 and registers the time-out signal with the OS (S32, S33). When the SCMs provided in the SNP 40 and the SSPs 40-1~40-n of the MP 400 respectively receive the SW times, the SCMs stores the MP time therein (S34) and computes the difference between the OMP time and the MP time (S35). After computing the time difference between the OMP time and the MP time, the SCM block increases the count value same_cnt by '1' when the computed time difference is the predetermined value (3 seconds) and below, and returns to the step S34 (S37). Then the SCM block repeatedly performs the above process, for thereby comparing the MP time with the OMP time. Such a comparison is carried out until the SCM receives the time-out signal from the OS. When receiving the time-out signal (S38), the SCM block compares the count value same_cnt with a predetermined value (3 times) (S39). Here, if the count value same_cnt is greater than the predetermined value or more, the SCM block resets the system time as the OMP time and then distributes the reset system time to the MP 400 (S40, S41). However, if the SW time is not supplied from the MP until the time-out signal is inputted, or if the count value same_cnt is less than the predetermined value, the SCM block proceeds to a step S42, which will be later described, and compares the times of the MP 400.

FIG. 3D is a flowchart illustrating an operation for comparing the MP times and determining the system time. As shown therein, the SCM block requests the SW time to the MP 400 and registers the time-out signal with the OS (S42, S43). When receiving the SW times from the SNP 40 and the SSPs 40-1~40-n of the MP 400, the SCM block stores the SW times therein (S44) and computes the difference of the SW times from each other (S45). After computing the time difference, the SCM block increases the count value same_cnt by '1' when the computed time difference is a predetermined value (3 seconds) and below, and returns to the step S44 (S47). Then the SCM block repeatedly performs the above process, and when receiving the time-out signal (S48), the SCM block compares the count value same_cnt with a predetermined value (3 times) (S49). If the count value same_cnt is greater than the predetermined value, that is, when the case where the time difference is the 3 seconds and below is generated at least 3 consecutive times, the SCM block resets the system time as the OMP time and then distributes the reset system time to the MP 400 (S40, S41). As described above, the SCM block of the OMP 100 compares the HW time and the SW time of the OMP 100, or the SW times of the MP 400 every 1 minute, resets the system time and distributes the system time, thereby obtaining the time concordance of the switching system.

Generally, in a distribution processor environment, an internal communication (IPC) delay unavoidably occurs in the IPC among processors. However, in the conventional time management the time difference due to the IPC delay is not considered, but the time is managed through the simple comparison of the HW time, the OMP time and the MP time, which results in the time discordance with the actual time in the periodical time concordance check.

Further, in the conventional time management method, the system time always maintains the HW time as long as the HW time is received. However, since the conventional time management does not secure the reliability of the HW time, the system time and the times distributed to the processors can be erroneously set when the HW time is temporally changed.

In addition, since the conventional time management method performs the time setting and correcting by unconditionally making the MP time concur with the system time, if the present MP time is faster than the system time, the MP time instantaneously or for a certain period passes backward, while if the MP time is slower than the system time, the MP time instantaneously passes forward. Thus, in reality, since a phone call of 3 minutes is reported as 3 minutes and 10 seconds, or a phone call of 10 minutes is reported as 8 minutes, the reliability of the metering which is closely related to the time management can not be secured.

SUMMARY OF THE INVENTION

Accordingly, the present invention is directed to a time management method for a switching system which obviates the problems and disadvantages in the conventional art.

An object of the present invention is to provide a time management method for a switching system that secures reliability of a system time management.

Another object of the present invention is to provide a time management method for a switching system that avoids time disconcordance due to an IPC delay.

Still another object of the present invention is to provide a time management for a switching system that secures reliability of an HW time.

To achieve these and other advantages and in accordance with the purpose of the present invention, as embodied and broadly described herein, there is provided a time management method for a switching system that periodically checks a failure state of an HW time using an OMDC in which an OMP sets an initial system time in accordance with the failure state of the HW time.

Also, to achieve the above objects of the present invention, there is provided a time management method for a switching system that computes an IPC delay by managing an RTC count value by each processor, and spontaneously sets and corrects a system time or an MP time by comparing the computed IPC delay with a time difference between an HW time and an OMP time or a time difference between the MP time and the OMP time.

Also, to achieve the above objects of the present invention, in a time management apparatus for a switching system provided with an OMP which is a master processor of a system time management, an OMDC which provides an HW time which is accessed by an HW time device to the OMP and an MP connected with the OMP, a time management method for a switching system include: periodically checking a failure state of an HW time using an OMDC; setting the HW time or a user time as an initial system time in accordance with the failure state of the HW time; resetting a system time by periodically comparing the HW time or an MP time, in which an IPC delay is considered, with an OMP time; requesting the initial system time to an OMP; setting an initial MP time as the received OMP time; and periodically comparing the MP time in which the IPC delay is considered with the OMP time and thereby resetting the MP time.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flowchart illustrating an initial system time setting;

FIG. 3A is a flowchart illustrating an operation of periodically comparing an HW time with an OMP time and thus determining a system time;

FIG. 3D is a flowchart illustrating an operation of comparing MP times and thus determining the system time;

DETAILED DESCRIPTION OF THE INVENTION

Reference will now be made in detail to the preferred embodiments of the present invention, examples of which are illustrated in the accompanying drawings.

Figure 1:
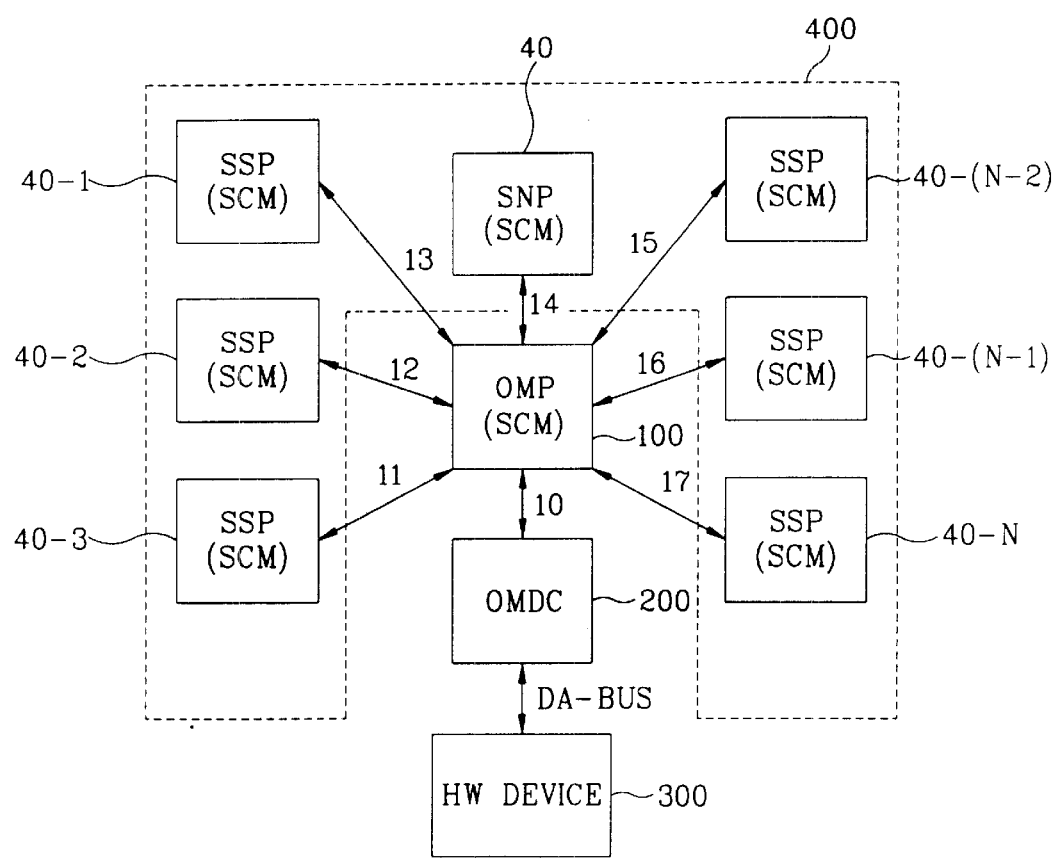
FIG. 1 is a block diagram illustrating a time management apparatus of a conventional switching system.
Figure 3B:
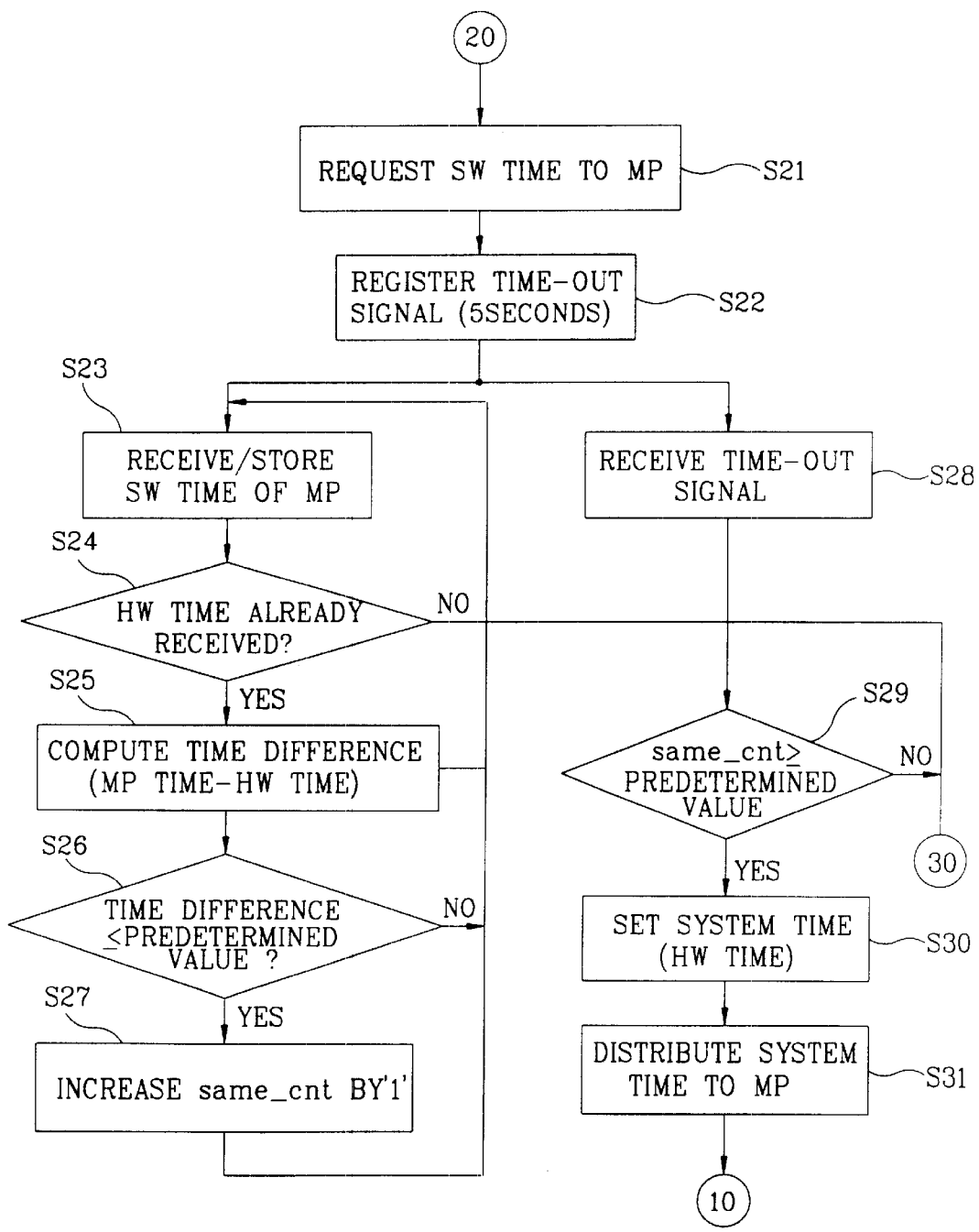
FIG. 3B is a flowchart illustrating an operation of periodically comparing an HW time with an MP time and thus determining a system time.
Figure 3C:
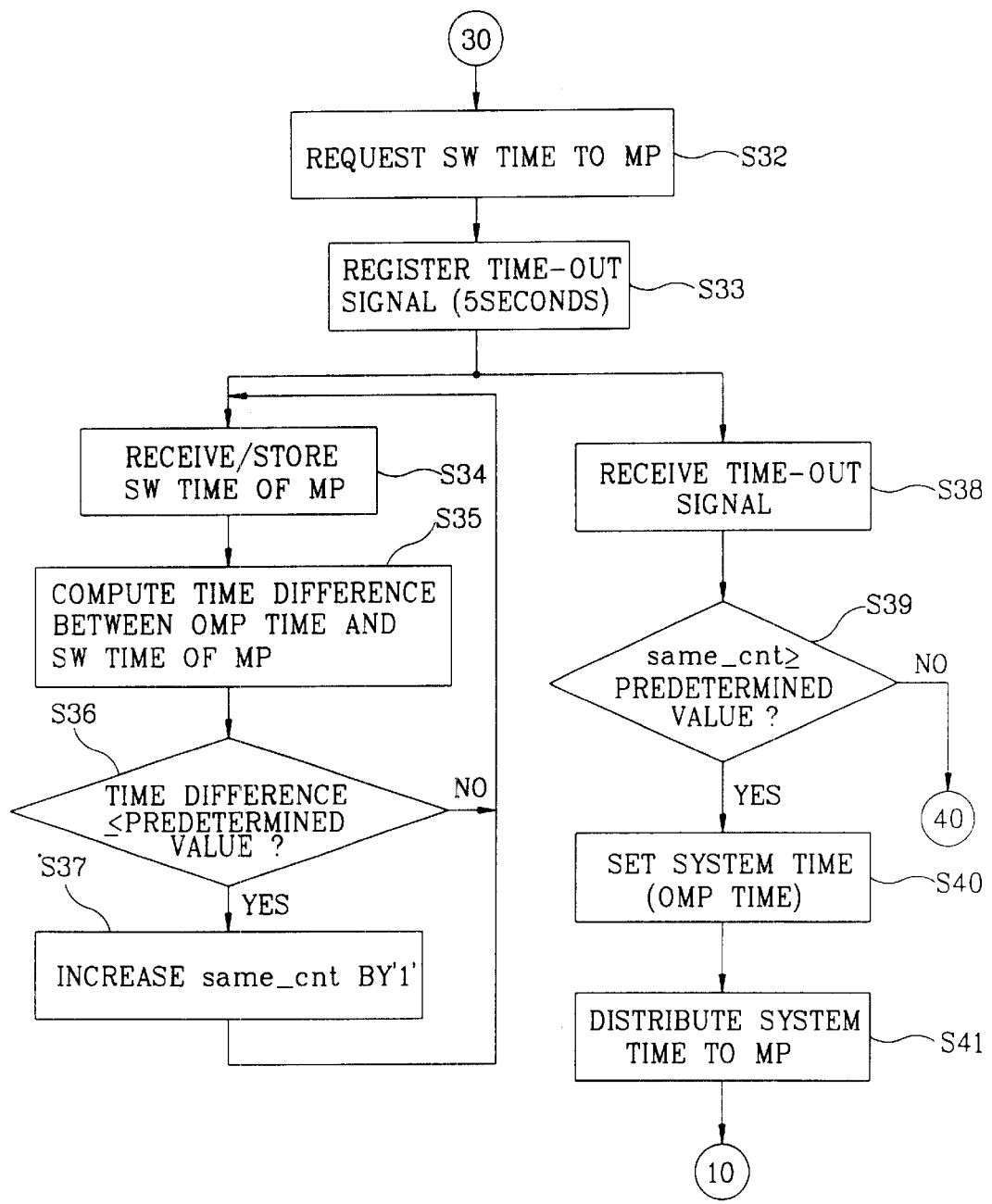
FIG. 3C is a flowchart illustrating an operation of periodically comparing an OMP time with an MP time and thus determining a system time.

The configuration and operation of a time management apparatus for a switching system according to the present invention is basically same as the apparatus in FIG. 1. In the time management apparatus of the switching system according to the present invention, an OMDC 200 periodically checks an HW time, thereby securing the reliability of the HW time, and an SNP 40 and SSPs 40-1~40-n are respectively provided with RTC counters each of which increases by '1' in a cycle of 40 msec, for thereby managing a RTC count value RTC_CNT. Here, an RTC is generated in each processor and the SNP 40 and the SSPs 40-1~40-n respectively count the RTC in a specific unit (8 msec or 40 msec) and then supply the counted RTC to an application. Accordingly, the OS provides a primitive which supplies the count value RTC_CNT when the application employs a time-related primitive.

Further, the MP 400 requests a present time to the OMP 100 and sets a time received from the OMP 100 as its time. Also, each of the SCMs of the MP 400 periodically compares the time received from the OMP with its time and thus spontaneously corrects its own time.

With reference to the accompanying drawings, the time management method for the switching system according to the present invention will be described in more detail.

Checking of HW Time Reliability

Figure 4:
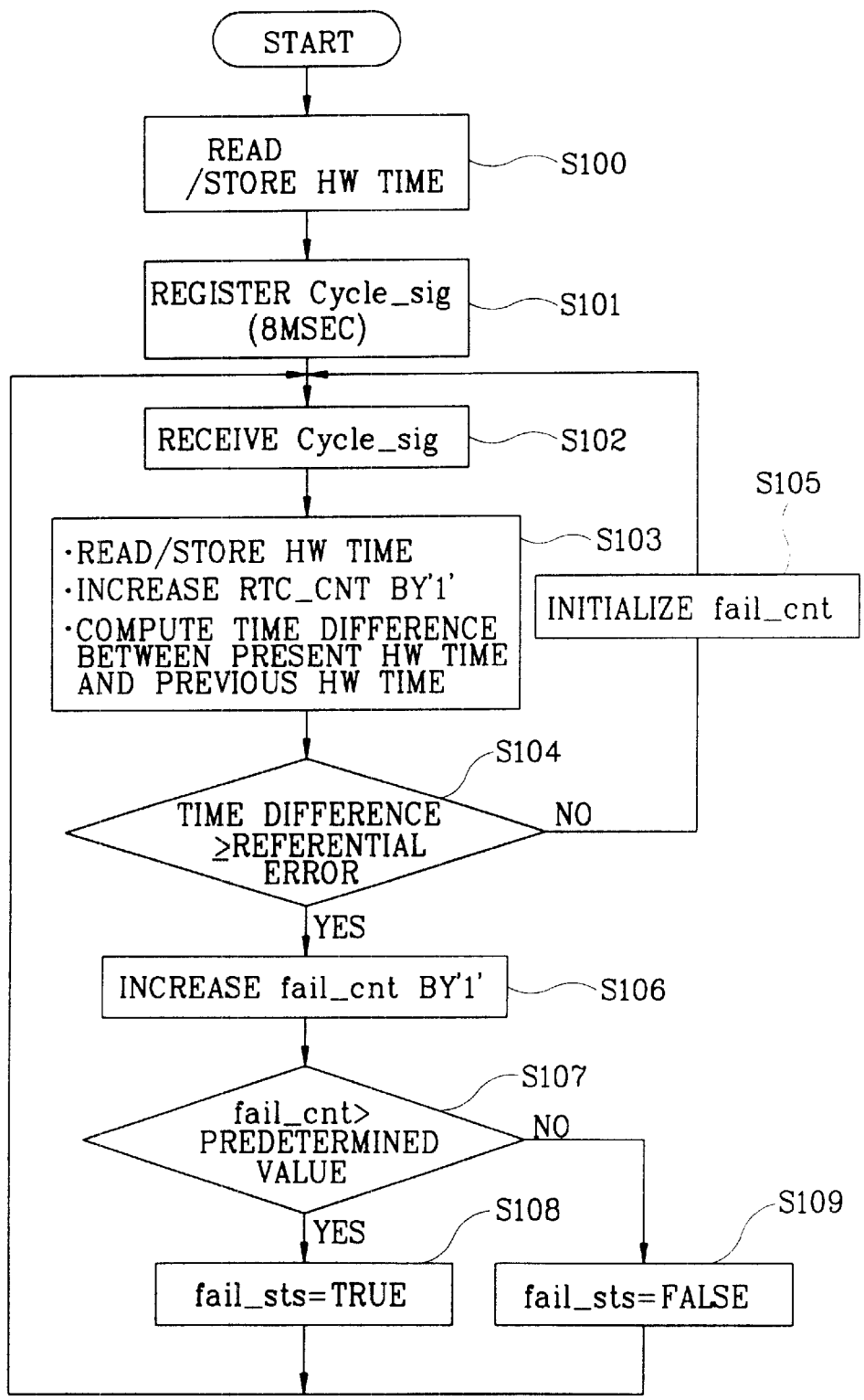
FIG. 4 is a flowchart for checking HW time failure in a time management method of a switching system according to the present invention.

FIG. 4 is an operation flowchart of the OMDC 200 for checking the reliability of the HW time. As shown therein, the OMDC 200 reads an HW time from an HW time device 300, stores therein (S100), and registers a cycle signal Cycle_sig of 8 msec with the OS (S101). A cycle of the cycle signal Cycle_sig can be set as 8 msec, 40 msec, 200 msec, 1 min, or 1 sec. In the present invention, the cycle signal Cycle_sig of 8 msec will be taken as an example for the convenience of the explanation.

Next, when receiving the cycle signal Cycle_sig from the OS (S102), the OMDC 200 increases a count value RTC_CNT by '1' and again reads the HW time from the from the HW time device 300 and stores the HW time therein (S103). Here, it is to be noted that the count value RTC_CNT which increases by 1 every 8 msec accumulates from '0' whenever reaching a certain number (4294967296). Further, the OMDC 200 computes a time difference between a present HW time and a previously stored HW time (S103). When the above step S103 is completed, the OMDC 200 compares the computed time difference with a referential difference (S104). Here, the referential difference varies in accordance with the cycle of the cycle signal Cycle_sig. For example, when the cycle of the cycle signal Cycle_sig is 40 msec and below, the referential difference is set as 8 msec, when the cycle thereof is 1 second and below, the referential difference is 4 msec, and when the cycle thereof is 1 minute and below, the referential difference is 100 sec.

As a result, if the time difference between the present HW time and the previously stored HW time is less than the referential difference 8 msec, the OMDC 200 initializes a count value fail_cnt indicating that the HW time is abnormal and returns to the step Si 02 (Si 05). While, when the time difference between the HW times is the same as the referential difference 8 msec or more, the OMDC 200 increases the count value fail_cnt by '1' and then compares the resultant count value fail_cnt with a predetermined value, which is '3' (S106, S107). If the count value fail_cnt is the same as the predetermined value or more, that is, if a case where the HW time is abnormal is generated 3 consecutive times, the OMDC 200 sets an HW time failure flag fail_sts as 'TRUE' (S108), and if the case where the HW time is abnormal is less than 3 times, the OMDC 200 sets the HW time failure flag fail_sts as 'FALSE' (S109).

As described above, when the time difference between the HW present and previous times exceeds the referential difference at least 3 consecutive times in each cycle, the OMDC 200 sets the HW time failure flag fail_sts as 'TRUE', thus indicating that HW time is unreliable.

Initial System Time Setting

Figure 5:
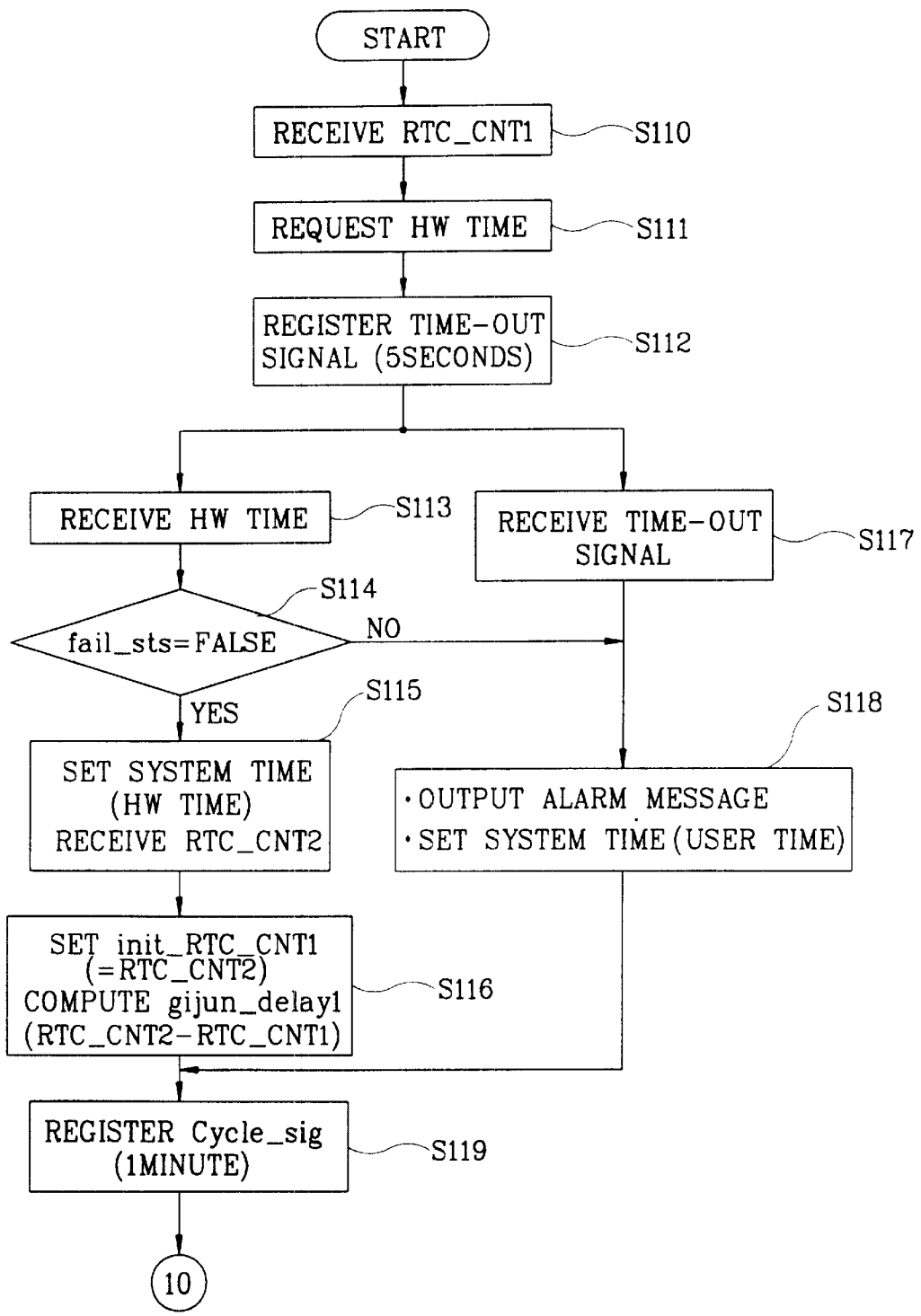
FIG. 5 is a flowchart illustrating an operation for setting an initial system time in the time management method of the switching system according to the present invention.

FIG. 5 is a flowchart illustrating an operation for setting an initial system time when starting (or restarting) the system. As shown therein, when starting the system, the OMP 100 or the SCM block, the SCM block receives an RTC count value RTC_CNT1 from the OS and then requests an HW time to the OMDC 200 (S110, S111). The RTC is a processor clock signal which is generated in the cycle of 40 msec, and the RTC_CNT which is used when obtaining a relative time of a processor increases by '1' in the cycle of 40 msec. Further, the SCM block registers a timeout signal(5 seconds) with the OS (S112). When receiving the HW time from the OMDC 200 (S113), the SCM block checks a state of the HW time failure flag fail_sts of the OMDC 200 and thus checks the reliability of the HW time (Si 14). Here, when the HW time failure flag fail_sts is set as 'FALSE', the SCM block sets the HW time as the initial system time(the initial system time=the HW time), and receives an RTC count value RTC_CNT2 from the OS (S115).

Further, to periodically check the time concordance, an initial RTC count value init_RTC_CNT and an initial IPC delay gijun_delay are computed in accordance with following formulas. Here, the initial RTC count value init_RTC_CNT is an initial RTC count value in a system set-up and used when obtaining a relative time, and the initial IPC delay gijun_delay which is used for correcting the difference afterwards is an IPC delay time which takes for which the OMP 100 requests a time to the OMDC 200 when determining the initial system time and receives the time therefrom.

init_RTC_CNT1=RTC_CNT2 gijun_delay1=(RTC_CNT2-RTC_CNT1)*40 msec

However, if the SCM block does not receives the HW time from the OMDC 200 until the time-out signal is inputted (S117), or if the HW time failure flag fail_sts is set as 'TRUE', the SCM block outputs an alarm message and then sets a time which is determined by the user as the initial system time (the initial system time=the user time) (S118). Then, to check the time concordance, which will be later described, the SCM block registers a cycle signal Cycle_sig of a 1 minute cycle with the OS (S119).

Periodical Time Concordance Checking of System Time

Figure 6A:
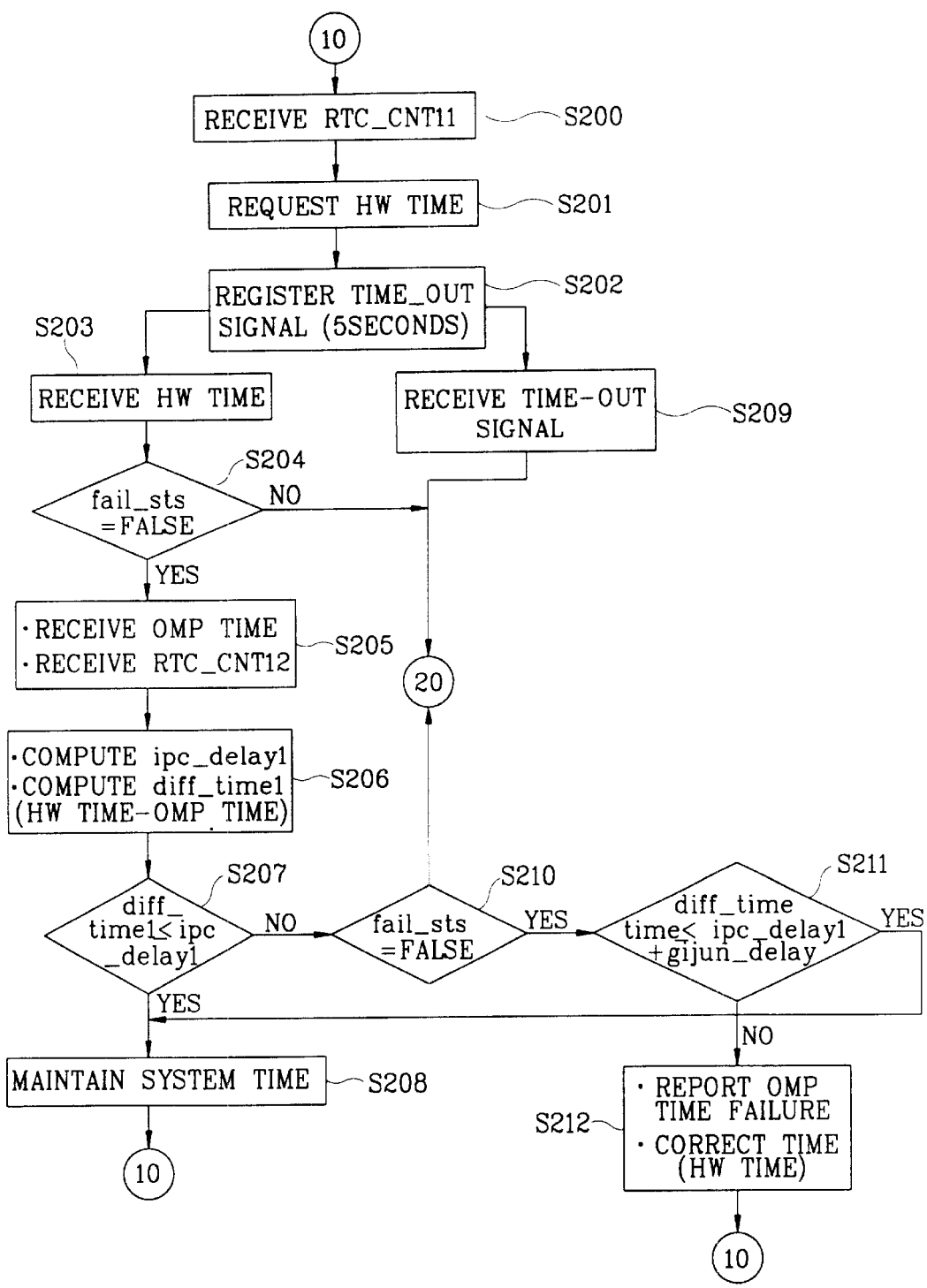
FIG. 6A is a flowchart illustrating an operation of periodically comparing an HW time with an OMP time, for thereby maintaining and correcting a system time in the time management method of the switching system according to the present invention.

FIG. 6A is a flowchart illustrating an operation of checking time concordance with reference to the HW time and the OMP time. As shown therein, the SCM block of the OMP 100 determines a time, allowing an IPC delay difference. That is, the SCM block maintains a present time if an time difference between the OMP time and the HW time is the IPC delay and below, and corrects the present time to the HW time if the time difference between the OMP time and the HW time is the same as the IPC delay or more. The above-mentioned operation will now be described in more detail.

As shown therein, the SCM block of the OMP 100 receives an RTC count value RTC_CNT11 from the OS when there is an HW time request, and requests an HW time to the OMDC 200 (S200, S201). The SCM block registers a time-out signal of 5 seconds with the OMDC 200 (S202). When receiving the HW time from the OMDC 200 (S203), the SCM block checks a state of the HW time failure flag fail_sts of the OMDC 200 for thereby checking the reliability of the HW time (S204). When the HW time failure flag fail_sts is set as 'FALSE', the SCM block reads an RTC count value RTC_CNT12 and the OMP time, when receiving the HW time, from the OMP 100 (S205). Here, the RTC count value RTC_CNT 12 is obtained by counting an initial RTC count value init_RTC_CNT using the RTC counter provided therein. The SCM block computes the time difference diff_time and the IPC delay ipc_delay in accordance with following formulas.

diff_time1=OMP time-HW time ipc_delay1=(RTC_CNT12-RTC_CNT11)*40 msec

Further, the SCM block compares the time difference diff_time1 with the IPC delay ipc_delay (S207). Here, the SCM block maintains the system time as it is (S208), if the time difference diff_time1 is less than the IPC delay ipc_ delay1, while the SCM block checks the state of the HW time failure flag fail_sts (S210), if the time difference diff_time1 the same as the IPC delay ipc_delay or more. When the HW time failure flag fail_sts is set as 'FALSE', the SCM block proceeds to a step S211 and again compares the time difference diff_time1 with a maximum IPC delay ipc_delay1+gijun_delay1. Here, 'gijun_delay1' in the maximum IPC delay ipc_delay1+gijun_delay1 has a unit of msec, but has a permissible limit up to 1 second at its maximum. When the time difference diff_time1 is less than the maximum IPC delay ipc_delay1+gijun_delay1, the SCM block maintains the system time (S208). While, when the time difference diff_time1 is the same as the maximum IPC delay ipc_delay1+gijun_delay1 or more, the SCM block outputs a failure message of the OMP time and then corrects the system time to the HW time (S212). Here, the difference between system time and the HW time is corrected with slow setting (200 msec and below). However, if the SCM block does not receive the HW time from the OMDC 200 (S209) until the time-out signal is inputted, or the HW time failure flag fail sts is set as 'TRUE' in the step S204 or S210, the SCM block proceeds to a step S220 to refer the SW time of the MP 400.

Figure 6B:
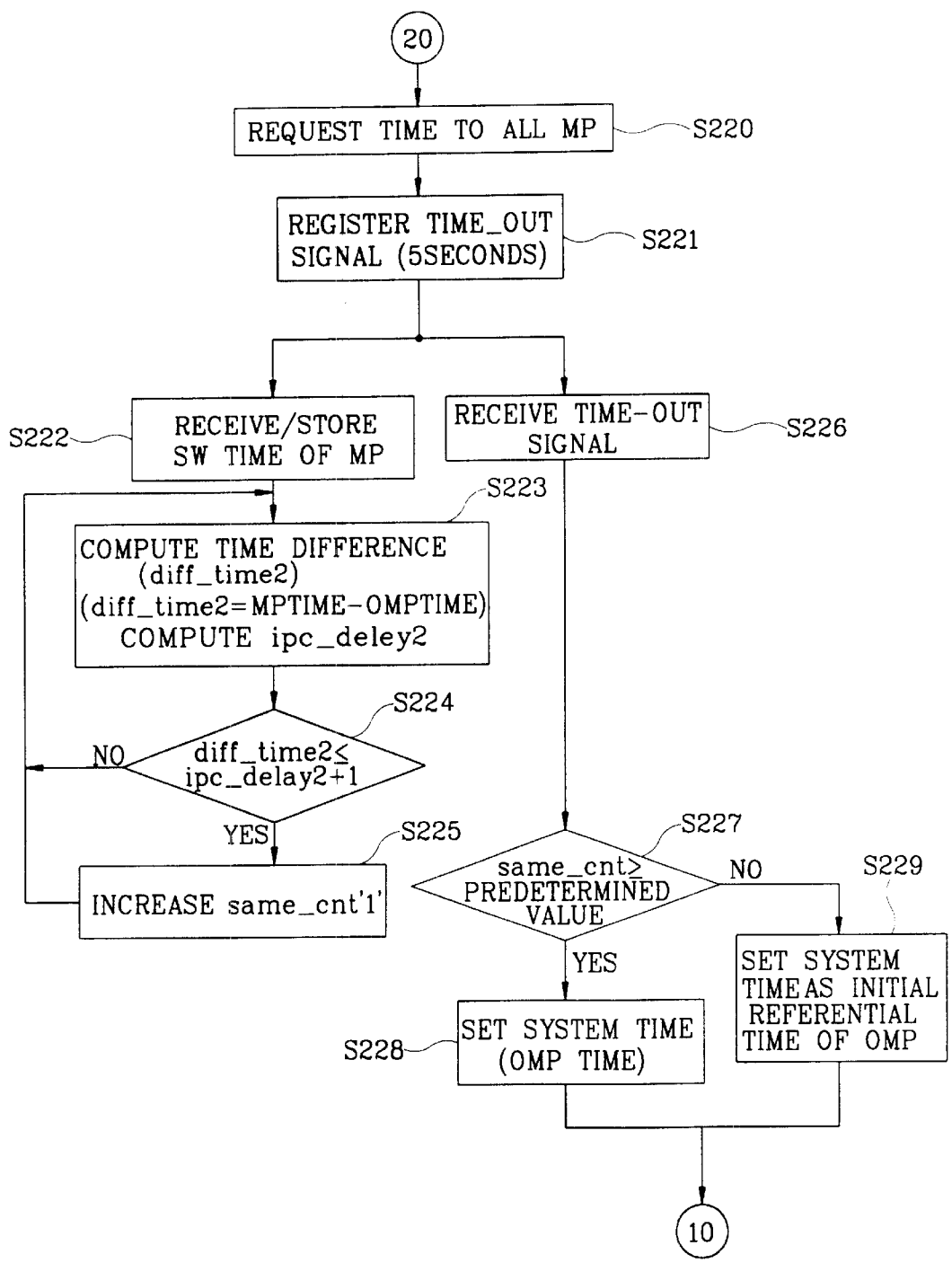
FIG. 6B is a flowchart illustrating an operation of periodically comparing an HW time with an OMP time, for thereby resetting a system time in the time management method of the switching system according to the present invention.

FIG. 6B is a flowchart illustrating an operation for checking the time concordance by comparing the MP time with the OMP time (the system time).

As shown therein, when the SCM block fails in the system time setting in accordance with the HW time, the SCM block of the OMP 100 requests the SW time to the internal units of the MP 400 (S220) and registers a time-out signal of 5 seconds with the OS (S221). When receiving the SW time from the MP 400, the SCM block stores the SW time therein (S222) and computes a time difference diff_time2 between the MP time and the OMP time and an IPC delay ipc_delay2 using the above-described method. Then, the SCM block compares the time difference diff_time2 with the IPC delay ipc_delay2 (S224). Here, if the time difference diff_time2 is less than a maximum IPC delay ipc_delay2+1 (sec), the SCM block increases the count value same_cnt by '1' and repeats the processes after the step S223 (S225). Here, 1 second in the maximum IPC delay ipc_delay2+1 (sec) is a maximum permissible difference limit. Next, when receiving the timeout signal (S226), the SCM block compares the count value same_cnt with a predetermined value (3 times) (S227) and the SCM block sets the system time as the time of the corresponding OMP 100 when the count value same_cnt is the same as the predetermined value or more (S228). That is, when a case where the time difference diff_time2 is less than the maximum IPC delay ipc_delay2+1 (sec) is generated at least 3 consecutive times, the SCM block sets the system time as the time of the OMP 100. While, if the count value same_cnt is less than the predetermined value, the SCM block resets the system time as the initial referential time (the initial system time) (S229). Next, the SCM block of the OMP 100 repeatedly operates the steps in FIG. 6A and 6B for thereby periodically checking the time concordance.

Initial SW Time Setting of MP

Figure 7A:
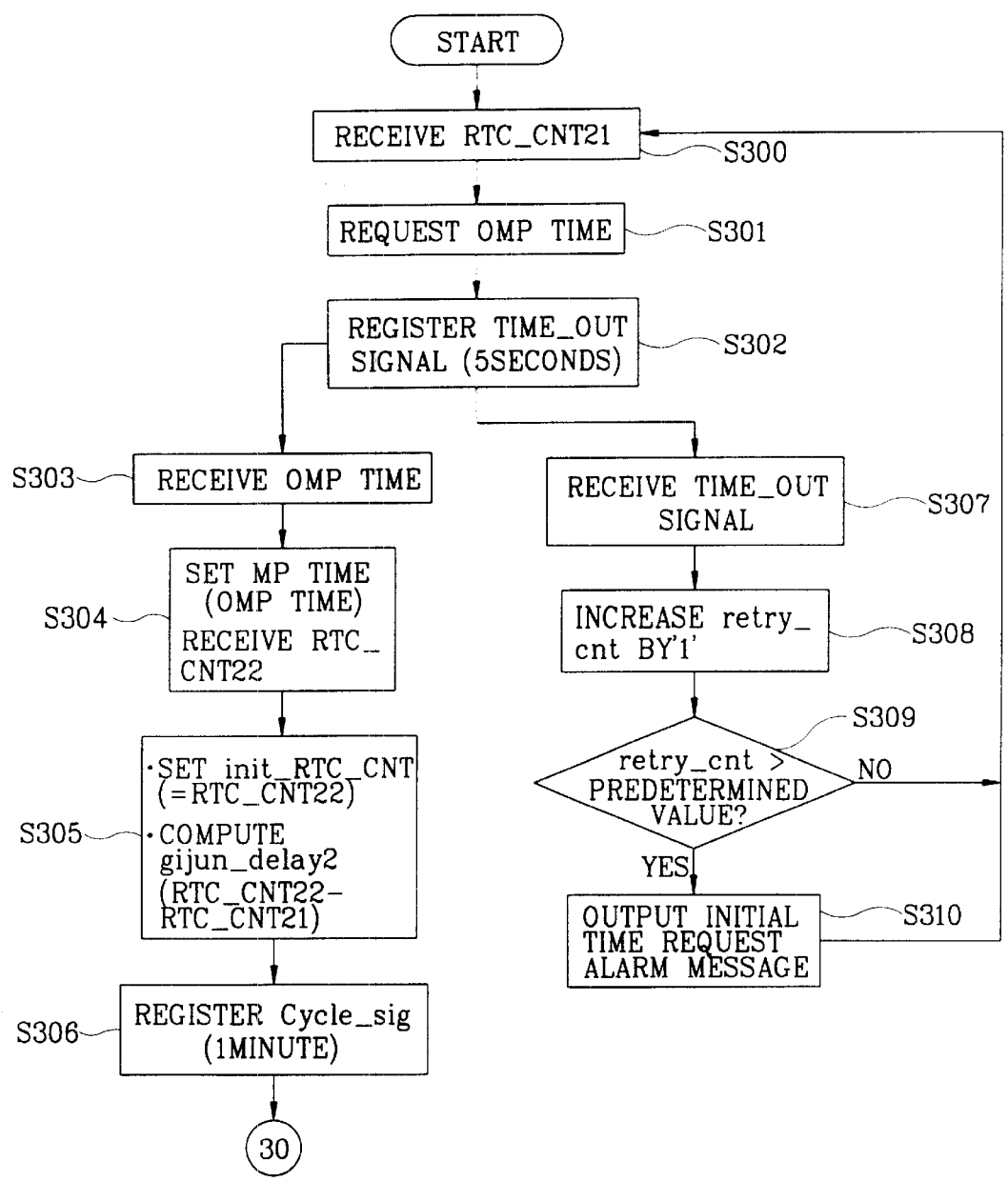
FIG. 7A is a flowchart illustrating an operation of setting an initial MP time in the time management method of the switching system according to the present invention.

FIG. 7A is an operational flowchart illustrating an SW time determining method of the MP 400. As shown therein, each of the SCMs of the MP 400 receives an RTC count value RTC_CNT21 from the OS when there is an OMP time request, requests a system time to the OMP 100 (S300, S301) and then registers a time-out signal of 5 seconds with the OS (S302). When receiving the system time from the OMP 100 (S303), each SCM sets the received system time (the OMP time) as th SW time of the MP 400 and then receives an RTC count value RTC_CNT22 from the OS when receiving the system time (S304). Further, to periodically check the time concordance, the SCM computes an initial RTC count value init_RTC_CNT2 and an initial IPC delay gijun_delay2 in accordance with following formulas (S305) and then registers a cycle signal Cycle_sig of a 1 minute cycle with the OS for time concordance checking which will be later described (S306).

init_RTC_CNT2=RTC_CNT22 gijun_delay2=(RTC_CNT22−RTC_CNT21)*40 msec

However, if each of the SCMs of the MP 400 does not receive the system time from the OMP 100 until the time-out signal is inputted (S307), each SCM increases a retry count value retry cnt by '1' and repeatedly performs the processes after the step S300. Next, when the retry count value retry_cnt is greater than the predetermined value ('3'), that is, a case where the MP 400 does not receive th system time from the OMP 100 is generated at least 3 consecutive times, each of the SCMs of the MP 400 outputs an initial time request alarm message to the user and maintains the time of itself (S310). Such a condition is incurred due to the abnormality of the OMP 100 or the SCM block thereof, or an obstacle to the communication between processors, but it seldom happens. Next, when such an abnormality is settled, the MP 400 repeatedly performs the processes after the step S300, so that the time of the MP 400 concurs with the system referential time (the OMP time).

Time Concordance Checking of MP Time

Figure 7B:
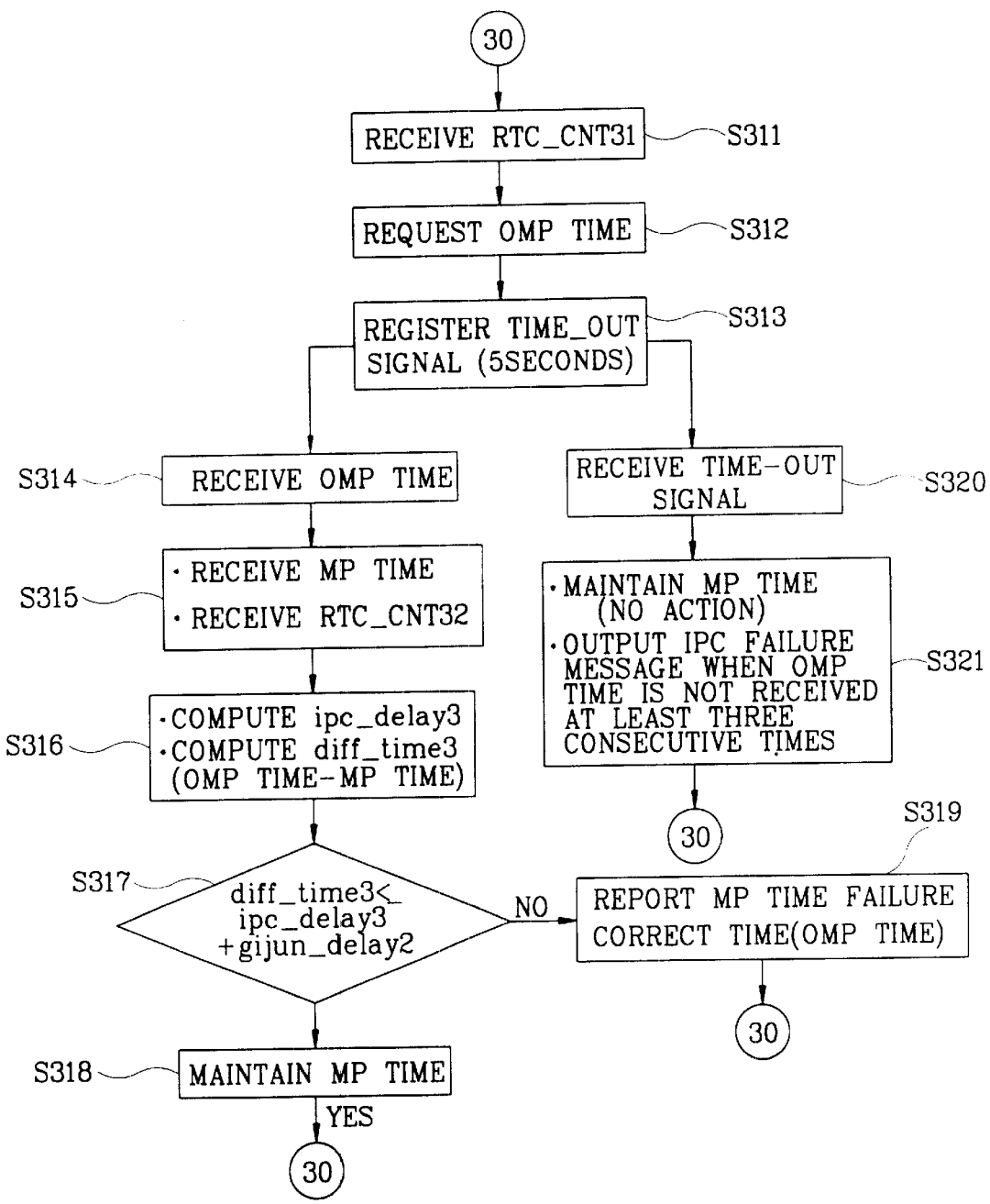
FIG. 7B is a flowchart illustrating an operation of resetting an MP time by comparing the MP time with the OMP time in the time management method of the switching system according to the present invention.

FIG. 7B is an operation flowchart illustrating a periodical time concordance checking process of the MP 400. As shown therein, each SCM of the MP 400 determines a-time allowing an IPC delay difference. That is, if the difference between an MP time and an OMP time is less than the IPC delay difference, the SCM of the MP 400 maintains the present time, and if the difference is the same as the IPC delay or more, the SCM of the MP 400 corrects the time to the OMP time.

More specifically, each SCM of the MP 400 receives an RTC count value RTC_CNT31 from the OS in a 1 minute cycle when requesting an OMP time and requests a system time to the OMP 100 (S311, S312). Also, the SCM registers a time-out signal of 5 seconds with the OS (S313). When receiving the OMP time (S314), the SCM of the MP 400 reads an RTC count value RTC_CNT32 and an MP time (S315). Here, the RTC count value RTC_CNT32 can be obtained by counting the initial RTC count value init_RTC_CNT2, using the RTC counter. Further, the SCM of the MP 400 computes a time difference diff_time3 and an IPC delay ipc_delay3 in accordance with following formulas.

diff_time3=MP time−OMP time ipc_delay3=(RTC_CNT32−RTC_CNT32)*40 msec

Next, the SCM of the MP 400 compares the time difference diff_time3 with the IPC delay ipc_delay3 (S316). If the time difference diff_time3 is less than a maximum IPC delay ipc_delay3+gijun_delay2, the SCM of the MP 400 maintains the MP time as it is, while if the time difference diff_time3 is the same as the maximum IPC delay ipc_delay3+gijun_delay2 or more, the SCM of the MP 400 outputs an MP time failure message and corrects the MP time to the OMP time. Here, the difference between the MP time and the OMP is corrected by the RTC counter with slow setting (200 msec and below). However, if not receiving the system from the OMP 100 until the time-out signal is inputted (S320), the SCM of the MP 400 maintains the MP time and if the OMP time is not inputted at least 3 times, the SCM of the MP 400 outputs an IPC failure message (S321). The SCM of the MP 400 requests the system time to the OMP 100 in the 1 minute cycle and thereby performs the time management, considering the time difference as the IPC delay.

As described above, the time management method for the switching system has an effect of obtaining the reliability of the system time setting by checking the reliability of the HW time using the OMDC. Also, since the time management method for the switching system performs the time setting and correcting operations considering the IPC delay of the processors, the reliability of the system time management can be secured.

Further, the time management method for the switching system corrects the difference from the system time by the slowing setting by providing a separate RTC counter in each processor. Thus, when correcting the time, an instance time change as in the conventional art can be prevented, thereby securing the reliability of various functions such as metering.

It will be apparent to those skilled in the art that various modifications and variations can be made in the time management method for the switching system of the present invention without departing from the spirit or scope of the invention. Thus, it is intended that the present invention cover the modifications and variations of this invention provided they come within the scope of the appended claims and their equivalents.

What is claimed is:

1. In a time management apparatus for a switching system provided with an OMP (operating and maintenance processor) which is a master processor of a system time management, an OMDC (operating maintenance device controller) which provides an HW time which is accessed by an HW time device to the, OMP and an MP (maintenance processor) connected with the, OMP, a time setting method for a switching system, comprising:

periodically checking a failure state of an HW time;

setting an initial system time in accordance with the failure state of the HW time;

registering a periodical cycle signal with an OS (operation system); and periodically comparing the HW time or an MP time with an OMP time, being operated in a regular cycle in accordance with the. cycle signal, and resetting a system time in accordance with the failure state of the HW time and at least one IPC (inter processor communication) delay.

2. The system time setting method according to claim 1, wherein the step of checking the HW time failure includes the substeps of;

periodically reading from the HW time device and storing the HW time;

computing a time difference between a present HW time and a previous HW time;

comparing the time difference with a referential difference and then counting cases where the time difference is the same as the referential difference or more; and setting a failure flag if a count value is the same as a predetermined value or more.

3. The system time setting method according to claim 2, wherein the referential difference is 8 msec when an HW time reading cycle is 40 msec and below, 40 msec when, the HW time reading cycle is 1 second and below, and 100 sec when the HW time reading cycle is 1 minute and below.

4. The system time setting method according to claim 2, wherein if the time difference is less than the referential difference, the count value is initialized, and if the count value is below the predetermined value, the HW time failure flag is cancelled.

5. The system time setting method according to claim 1, wherein said comparing step includes:

periodically computing a time difference between the OMP time and the HW time or an MP time in accordance with the cycle signal, computing an IPC (inter processor communication) delay of the HW time or the MP time, and thereby resetting the system time in accordance with the failure-state of the HW time, the time difference, and the IPC delay.

6. The system time setting method according to claim 1, wherein the step of setting the initial system time includes the substeps of:

requesting the HW time to the OMDC;

determining the failure state of the HW time from HW failure flag of the OMDC when receiving the HW time from the OMDC;

setting the initial system time as the HW time when the HW time is normal; and computing an RTC count value supplied from the OS when requesting the HW time and an RTC count value when receiving the HW time, thereby obtaining an initial IPC delay.

7. The system time setting method according to claim 6, wherein when the HW time is not received from the OMDC or the received HW time is abnormal, a user time is set as the initial system time.

8. The system time setting method according to claim 1, wherein the step of resetting the system time includes the substeps of:

comparing the time difference between the HW time and the OMP time when the HW time is normal, thereby maintaining and correcting the system time; and comparing the time difference between the MP time and the OMP time with the IPC delay when the HW time is in failure or the HW time is not received, thereby setting the system time.

9. The system time setting method according to claim 8, wherein the substep of maintaining and correcting the system time includes:

periodically requesting the HW time to the OMDC and, when receiving the HW time, determining the failure state of the HW time from the failure flag of the HW time of the OMDC;

computing a time difference between the HW time and the OMP time when the HW time is normal, and computing a first IPC delay by subtracting an RTC count value when requesting the HW time from an RTC count value when receiving the HW time;

comparing the time difference with the first IPC delay;

maintaining the system time when the time difference is less than the first IPC delay;

comparing the time difference with a maximum IPC delay when the time difference is the same as the first IPC delay or more and the HW time is normal; and maintaining the system time when the time difference is less than the maximum IPC delay and correcting the system time to the HW time when the time difference is the same as the maximum IPC delay or more.

10. The system time setting method according to claim 9, wherein when the system time is corrected with slow setting below 200 msec.

11. The system time setting method according to claim 9, wherein the maximum IPC delay is obtained by adding an initial IPC delay and the first IPC delay, and the maximum IPC delay does not exceed 1 second (a maximum value of the maximum IPC delay=1 second).

12. The system time setting method according to claim 8, wherein the substep of setting the system time includes:
   requesting a time to all SCMs of the MP and storing MP times;
   computing a time difference between each MP time and the OMP time and computing a second IPC delay by subtracting the RTC count value when requesting the HW time from the RTC count value when receiving the HW time;
   comparing the time difference with the maximum IPC delay and thereby counting cases where the time difference is less than the maximum IPC delay;
   continuing cases where the count value is the same as a predetermined value or more; and
   setting the system time as the OMP time when the count value is the same as the predetermined value or more, and setting the system time as the initial system time when the count value is less than the predetermined time.

13. In a time management apparatus for a switching system which includes an OMP which sets a system time and an MP which is connected with the OMP and periodically requests an OMP time, an MP time setting method for a switching system, comprising:
   requesting an initial system time to the OMP;
   setting an initial MP time as an OMP time which is received;
   registering a periodical cycle signal with an OS; and
   periodically computing a time difference between the OMP time and the MP time in accordance with the cycle signal, -computing an IPC .(inter processor communication) delay of the OMP time, and thereby resetting the MP time in accordance with the time difference. and the IPC delay.

14. The MP time setting method for a switching system according to claim 13, wherein the step of setting the initial MP time includes the substeps of:
   requesting a system time to the OMP and receiving a first RTC count value from the OS when requesting an OMP time;
   setting the initial MP time as the received OMP time and receiving a second RTC count value from the OS when receiving the OMP time; and
   computing a time difference between the OMP time and the MP time and computing an initial IPC delay by subtracting the first RTC count value from the second RTC count value.

15. The MP time setting method according to claim 14, wherein in the step of setting the initial MP time, if the OMP time is not inputted at least 3 consecutive times, an initial time request alarm message is outputted to a user and the time of itself is maintained.

16. The MP time setting method according to claim 13, wherein the step of resetting the MP time includes the substeps of:
   requesting the system time to the OMP and receiving a third RTC count value from the OS when requesting the OMP time;
   receiving the OMP time and receiving a fourth RTC count value from the OS when receiving the OMP time;
   computing a time difference between the OMP time and the MP time and computing an IPC delay by subtracting the third RTC count value from the fourth RTC count value;
   comparing the time difference with a maximum IPC delay which is obtained by adding the initial IPC delay and the IPC delay; and
   maintaining the MP time if the time difference is less than the maximum IPC delay, and correcting the MP time to the OMP time if the time difference is the same as the maximum IPC delay or more.

17. The MP time setting method according to claim 16, wherein in the step of resetting the MP time, an IPC failure message is outputted when the OMP time is not inputted at least 3 consecutive times.

18. The MP time setting method according to claim 16, wherein the MP time is corrected with slowing setting below 200 msec.

19. In a time management apparatus for a switching system provided with an OMP which is a master processor of a system time management, an OMDC which provides an HW time which is accessed by an HW time device to the OMP and an MP connected with the OMP, a time management method for a switching system, comprising:
   periodically checking a failure state of an HW time;
   setting an initial system time in accordance with the failure state of the HW time;
   periodically computing a time difference between an OMP time and the HW. time or an MP time in accordance with the cycle signal, computing an IPC (inter processor communication) delay of the HW time or the MP time, and thereby resetting the system time in accordance with the failure state of the HW time, the time difference, and the IPC delay;
   requesting the initial system time to the OMP;
   setting an initial MP time as the received OMP time; and
   periodically computing a time difference between the OMP time and the MP time in accordance with the cycle signal, computing the IPC delay of the OMP time, and thereby resetting the MP time in accordance with the time difference and the IPC delay.

20. The time management method according to claim 19, wherein the step of checking the failure state of the HW time includes the substeps of:
   periodically reading from the HW time device and storing the HW time;
   computing a time difference between a present HW time and a previous HW time;
   comparing the time difference with a referential difference and then counting cases where the time difference is the same as the referential difference or more; and
   setting a failure flag if a count value is the same as a predetermined value or more.

21. The time management method according to claim 20, wherein the referential difference is 8 msec when an HW time reading cycle is 40 msec and below, 40 msec when the HW time reading cycle is 1 second and below, and 100 sec when the HW time reading cycle is 1 minute and below.

22. The time management method according to claim 20, wherein if the time difference is less than the referential difference, the count value is initialized, and if the count value is below the predetermined value, the HW time failure flag is cancelled.

23. The time management method according to claim 20, wherein the step of setting the initial system time includes the substeps of:

requesting the HW time to the OMDC;

determining the failure state of the HW time from HW failure flag of the OMDC, when receiving the HW time from the OMDC; and setting the initial system time as the HW time when the HW time is normal, and setting the initial system time as a user time when the HW time is abnormal.

24. The time management method according to claim 20, wherein the step of resetting the system time includes the substeps of:

periodically comparing the HW time with the OMP time when the HW time is normal, thereby maintaining and correcting the system time; and comparing the MP time and the OMP time when the HW time is in failure or the HW time is not received, thereby setting the system time.

25. The time management method according to claim 24, wherein the substep of maintaining and correcting the system time includes:

periodically requesting the HW time to the OMDC and, when receiving the HW time, determining the failure state of the HW time from the failure flag of the HW time of the OMDC;

computing a time difference between the HW time and the OMP time when the HW time is normal and computing a first IPC delay;

comparing the time difference with the first IPC delay;

maintaining the system time when the time difference is less than the first IPC delay;

comparing the time difference with a maximum IPC delay when the time difference is the same as the first IPC delay or more and the HW time is normal; and maintaining the system time when the time difference is less than the maximum IPC delay, and correcting the system time to the HW time when the time difference is the same as the maximum IPC delay or more.

26. The time management method according to claim 25, wherein the first IPC delay is obtained by multiplying 40 msec by a value for which an RTC count value when requesting the HW time is subtracted from an RTC count value when receiving the HW time and the maximum IPC delay is obtained by adding the first IPC delay to an initial IPC delay when setting the initial system time.

27. The time management method according to claim 24, wherein the substep of setting the system time includes:

requesting a time to all SCMs of the MP and storing MP times;

computing a time difference between each MP time and the OMP time and computing a second IPC delay from the RTC count values when requesting and receiving the HW time;

comparing the time difference with the maximum IPC delay and thereby counting cases where the time difference is less than the maximum IPC delay;

counting cases where the count value is the same as a predetermined value or more; and setting the system time as the OMP time when the count value is the same as the predetermined value or more, and setting the system time as the initial system time when the count value is less than the predetermined time.

28. The time management method according to claim 19, wherein the step of resetting the MP time includes the substeps of:

requesting the system time to the OMP;

receiving the OMP time and computing a time difference between the OMP time and the MP time and an IPC delay;

comparing the time difference with a maximum IPC delay; and maintaining the MP time if the time difference is less than the maximum IPC delay, and correcting the MP time to the OMP time if the time difference is the same as the maximum IPC delay or more.

29. The time management method according to claim 28, wherein the IPC delay is obtained by multiplying 40 msec by a value for which an RTC count value when requesting the OMP time is subtracted from an RTC count value when receiving the OMP time and the maximum IPC delay is obtained by adding the IPC delay to an initial IPC delay when setting the initial MP time.

* * * * *